Sept. 25, 1951     F. MAZZOLA ET AL     2,569,247
POT AND SINK PROTECTOR
Filed May 17, 1948
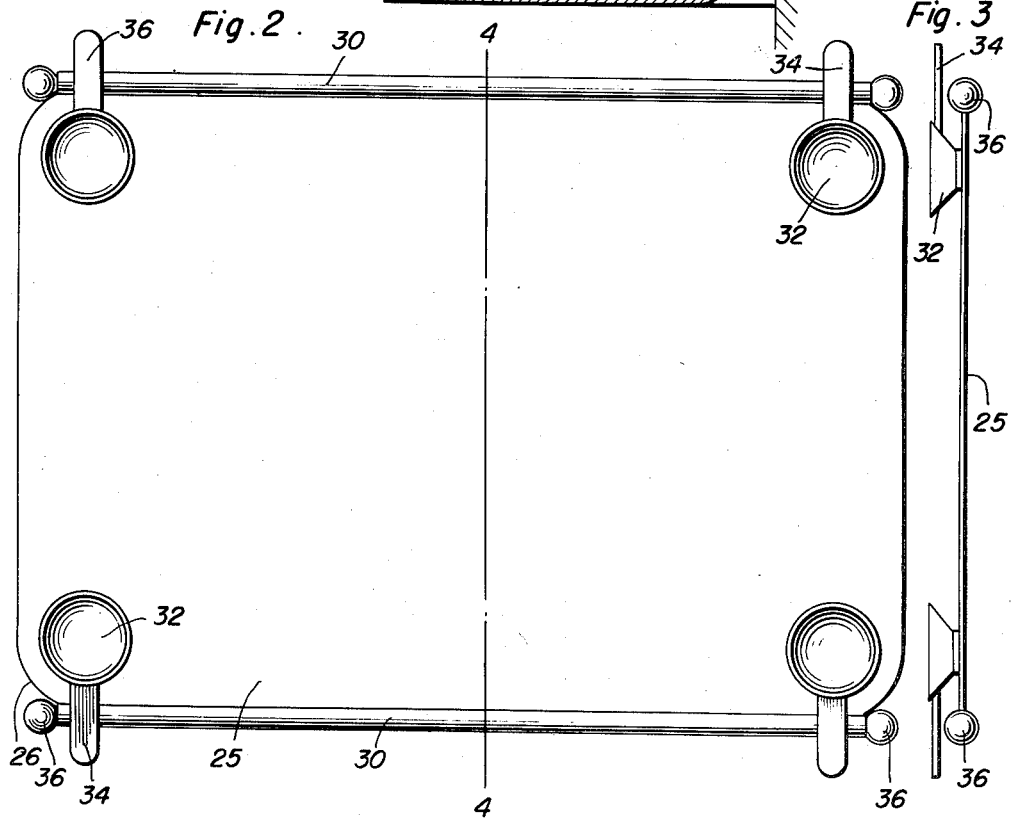
Frank Mazzola
Michele Mazzola
             INVENTORS Patented Sept. 25, 1951

2,569,247

UNITED STATES PATENT OFFICE 2,569,247

POT AND SINK PROTECTOR

Frank Mazzola, Bronx, N. Y., and Michele Mazzola, Cresskill, N. J.

Application May 17, 1948, Serial No. 27,437

3 Claims. (Cl. 4—187)

This invention comprises novel and useful improvements in a pot and sink protector and more specifically pertains to a cushioning mat which is particularly adapted for positioning in a sink for protecting the enameled sides thereof from damage by pots and pans during washing of the latter, as well as protecting dishes from chipping or damage by violent contact with the walls of the sink.

The principal object of this invention is to provide a protecting device which may be readily applied to and removed from sinks for protecting the finish of sinks from damage and for protecting dishes being washed in the sink from damage during the washing operation.

An important feature of the invention resides in the provision of a mat of a pliable, resilient and cushioning material having integrally attached thereto suction cups for positioning the mat in proper position to perform its functions, together with means for readily releasing the suction cups.

A further important feature of the invention resides in the provision of a protecting mat as set forth in the preceding objects and features of the invention, which mat is adapted for disposition upon a side wall in the interior of a sink, and is adapted to overlay a top surface of the sink in protective relation thereto.

A still further important feature of the invention resides in the provision of a protecting mat as set forth hereinbefore, which mat is provided with integral marginal beads inturned upon the upper and lower edges of the mat, which beads are embraced by a rigid sleeve-like longitudinally split member for clasping the bead of the mat in compressed relation therein and constituting a stiffening and reinforcing member at the edges of the mat, to facilitate the attaching and removing of the mat and the handling of the same.

Still another important feature of the invention resides in the provision of a protective mat as set forth in the above mentioned features and objects, wherein the reinforcing bead at each edge of the mat is provided with integral enlarged ball-like terminal portions which abut and embrace the ends of the stiffening or reinforcing sleeve, and serve to prevent the ends of the sleeve from striking or marring the side walls of the sink.

And a final important feature and object of the invention resides in the provision of a protective mat which shall be of simple and inexpensive construction, pliable and flexible in order that the same may be compactly folded and readily positioned on the curved surfaces associated with a sink, and which shall be highly efficient for the purposes intended.

These, together with various ancillary features and objects of the invention which will later become apparent as the following description proceeds, are attained by this device, a preferred embodiment of which has been illustrated by way of example only, in the accompanying drawings, wherein:

Figure 1 is a vertical sectional view showing one embodiment of the device mounted in operative position upon the walls of a sink;

Figure 2 is a bottom plan view of the protective mat shown in Figure 1;

Figure 3 is an end elevational view of the mat shown in Figure 2; and,

Figure 4 is a vertical transverse sectional detail view, parts being broken away, taken substantially upon the plane of the section line 4—4 of Figure 2.

Referring now more specifically to the accompanying drawings, wherein like numerals designate similar parts throughout the various views, the numeral 10 designates generally a portion of a kitchen sink which may be of any suitable construction and which may conveniently comprise a substantially vertical inner wall 12, having a curved top surface 14 which merges into a vertical outer wall 16, the sink having a bottom 18 and being provided with a vertical supporting surface 20 mounted in any suitable manner upon a wall 22 or the like.

It is to be understood that the upper surface of the sink 14 may not only include the upper rim at the outer end of the same, but may also include as indicated at 24, various horizontal surfaces such as drain boards or the like which are commonly associated with sinks.

It is intended that the protective mat forming the subject matter of this invention may be readily applied to any vertical inner surface or wall of a sink, and if desired may be secured to more than one such surface, although it will be generally found that the application of the device to one inner wall is sufficient for the purposes intended.

In applying the device the same is disposed upon the inner surface of a wall 12, to substantially cover the same from top to bottom, the width of the mat being so selected as to be conveniently and snugly accommodated within the width of the wall 12 of a sink. Being disposed to cover the inner surface of the wall 12, the mat is folded over a horizontal surface 14, and has its upper end either depending thereover and secured to the vertical outer wall 16, or resting upon this horizontal surface and secured thereto.

Preferably, this protective mat is formed of a single sheet of a pliable, flexible and cushioning material, such as rubber or the like, and is of substantially rectangular or square shape as desired. This mat 25 above mentioned is formed of a single piece of material which is preferably of less width than that of the surface to which the same is to be applied. Also preferably at its corners the mat 25 is rounded as at 26 for a purpose to be later set forth.

At its upper and lower marginal edges, the mat 25 is provided with integral inturned portions rolled upon themselves to form beads 28, which serve to stiffen and rigidify the upper and lower edges of the mat to facilitate the handling of the same. A sleeve 30 of any suitable material such as sheet metal, a suitable plastic or the like is split longitudinally of its ends and is disposed about the bead 28 in compressive and embracing relation thereto, to maintain the bead in its rolled up position. Of course, this sleeve 30 may be attractively covered with enamel or the like with a view to enhancing its appearance and improving its sanitary condition. Alternatively, a metal or plastic rod could be provided and the edge of the sleeve rolled thereover and thereabout to prevent any metal contacting the sink.

Secured to the undersurface of the mat 25 preferably adjacent but inwardly spaced from each of the four corners thereof, are a plurality of suction cups of any desired type as indicated at 32, which may be integral or attached in desired manner such as by cementing to the rubber mat or the like. Laterally extending from the suction cups 32 are integral tabs 36 which extend beyond the ends of the mat, and constitute finger-grip means which after the mat is in position may be readily grasped by the fingers of the person using the mat to thereby release the suction cups and permit removal of the mat.

As will be readily apparent from Figure 2, the reinforced upper and lower marginal edges of the mat 25, consisting of the sleeve 30 and the bead 28, terminates short of the sides of the mat, and preferably adjacent the end of the curved portions 26. Integrally formed upon the ends of the bead 28 are enlarged terminal portions 36 which may be spherical in shape, and which also terminate slightly short of the ends of the mat, to thereby avoid increasing the overall dimensions of the same, which enlarged portions serve the dual function of providing a means engaging the ends of the sleeve to assist in rigidly securing the bead therein, and also provide cushioning projections which prevent the metal or other sleeves from marring the adjacent surfaces or articles with which the same comes in contact.

From the foregoing, the construction and operation of the device together with its obvious advantages of ease of installation, light and inexpensive construction, adaptability to various surfaces to be protected, and its effectiveness for the purposes intended will be readily apparent and further explanation is believed to be unnecessary.

However, such numerous modifications and changes will readily occur to those skilled in the art after a consideration of the foregoing specification and accompanying drawings, it is not desired to limit the invention to the exact arrangement shown and described, but all suitable modifications and equivalents may be resorted to falling within the scope of the appended claims.

Having described the invention, what is claimed as new is:

1. A pot and sink protector comprising a mat of pliant flexible material of a size for reception upon the side of a sink, suction cups carried by the under surface of said mat for securing the mat inwardly of its corners to the inner and outer sides of a sink, tabs carried by said cups and extending beyond the rim of said mat for releasing said cups and an integral reinforcing bead on the bottom edge of said mat, said bead terminating in enlarged portions for abutting a surface of a sink.

2. The combination of claim 1 wherein said bead is of less length and has its extremities terminating inwardly of the sides of said mat, said enlarged portions terminating at the sides of the mat.

3. For use with a sink having a substantially vertical inner wall and a top surface conterminous with said wall, a protective mat of pliant cushioning material having a first portion of a size adapted for reception and engagement upon said wall and between the ends thereof and a second portion for engagement upon said top surface, reinforcing means for the edges of said portions consisting of integral beads, and a reinforcing sleeve split longitudinally of and compressively embracing said bead, said beed having enlarged terminal portions at the ends of said sleeve and means for releasably securing said mat to said upper surface.

FRANK MAZZOLA.
MICHELE MAZZOLA.

REFERENCES CITED

The following references are of record in the file of this patent:

UNITED STATES PATENTS

| Number | Name | Date |
|---|---|---|
| 921,734 | Pugh | May 18, 1909 |
| 2,167,178 | Kohlstadt | July 25, 1939 |
| 2,236,339 | Keith | Mar. 25, 1941 |